(12) United States Patent
Hane (10) Patent No.: US 11,835,633 B1
(45) Date of Patent: Dec. 5, 2023

(54) HIGH POWER GRID GLOBAL NAVIGATION SATELLITE SYSTEMS CORRECTIONS

(71) Applicant: Spectrum Co, LLC, Arlington, VA (US)

(72) Inventor: John Hane, Bethesda, MD (US)

(73) Assignee: SPECTRUM CO, LLC, Arlington, VA (US)

( * ) Notice: Subject to any disclaimer, the term of this patent is extended or adjusted under 35 U.S.C. 154(b) by 22 days.

(21) Appl. No.: 17/869,715

(22) Filed: Jul. 20, 2022

Related U.S. Application Data (60) Provisional application No. 63/223,942, filed on Jul. 20, 2021.

(51) Int. Cl.
*G01S 19/23* (2010.01)
*G01S 19/31* (2010.01)
*G01S 19/25* (2010.01)

(52) U.S. Cl.
CPC ............ *G01S 19/235* (2013.01); *G01S 19/25* (2013.01); *G01S 19/31* (2013.01)

(58) Field of Classification Search
CPC ......... G01S 19/31; G01S 19/25; G01S 19/235
USPC ...... 342/352, 450, 357.31, 463, 457, 357.14
See application file for complete search history.

(56) References Cited

U.S. PATENT DOCUMENTS

| | | | | |
|---|---|---|---|---|
| 6,195,609 B1* | 2/2001 | Pilley | ................... | G08G 5/0026 |
| | | | | 342/36 |
| 7,056,179 B2* | 6/2006 | Courtney | .............. | B63C 9/1255 |
| | | | | 441/90 |

\* cited by examiner

*Primary Examiner* — Bo Fan (57) ABSTRACT

Disclosed is a system for providing multiple location corrections streams to receiving devices using a high-power transmitter, such as a television station, for correcting errors in the determination of a location of a receiving device based on satellite data. The system enables a receiving device to select one of the location corrections streams for processing without any upstream/return path link to the television station or processing server. The system includes multiple base stations distributed across a geographic area that each transmit location corrections stream to the processing server, which combines them to a composite corrections stream and transmits it to television stations for further broadcasting. A receiving device within a coverage area of a television station receives the composite corrections stream, selects a corrections stream corresponding to a base station closest to the receiving device, and uses the selected corrections stream to correct the location determined using satellite data.

20 Claims, 7 Drawing Sheets

HIGH POWER GRID GLOBAL NAVIGATION SATELLITE SYSTEMS CORRECTIONS

CROSS REFERENCE TO RELATED PATENT APPLICATIONS

This patent application claims the benefit of U.S. Provisional Patent Application No. 63/223,942, entitled "HIGH POWER LAYERED GRID GNSS CORRECTIONS," filed on Jul. 20, 2021, which is incorporated by reference herein.

BACKGROUND

Position, Navigation and Timing (PNT) services are increasingly important to many aspects of daily life, as well as to commerce, government, and public safety. Satellite positioning systems such as the Global Positioning System (GPS) (United States), GLONASS (Russia), Galileo (European Union) and, BeiDou (China), known as Global Navigation Satellite Systems (GNSS), are the central and by far the most important elements of PNT services globally. Given the importance of PNT services, considerable investments of human ingenuity, money, and other resources have been directed to improving the precision, reliability, integrity, and availability of GNSS services.

There is a need for a system that can provide significant improvements to precision, and that can be used reliably, simultaneously and continuously (e.g., 24×7×365) by a significant number of users or devices (e.g., millions or billions) at no incremental cost per user or device, just as GNSS systems themselves can.

SUMMARY

Methods and systems are described herein for an improved communication system for providing location correction data to receiving devices using high-power terrestrial transmissions, such as television stations. A receiving device may use the location correction data to compensate and correct for various kinds of errors that adversely impact precision and integrity of its location determined based on satellite data (e.g., data from a GNSS system such as the GPS system). A high-power grid may include a number of base stations distributed across a given geographic area (e.g., a number of base stations within a coverage area of a television station) that each calculate error factors for one or more satellites and transmit the computed location correction data as a corrections stream to a computer server. The computer server generates a composite corrections stream, which includes location coordinates and the corrections stream from each of the multiple base stations, and transmits the composite corrections stream to one or more television stations in the same geographic area as the base stations for broadcasting to receiving devices (e.g., in a radiofrequency (RF) such as very-high frequency (VHF), ultra-high frequency (UHF), or other suitable RF). A receiving device within a signal coverage area of a particular television station receives the composite corrections stream, selects a corrections stream corresponding to a base station (e.g., physical or virtual) that is closest the location of the receiving device (e.g., as determined by an approximate or uncorrected location determined using satellite data received by the receiving device), and applies the location correction data from the selected corrections stream to the uncorrected location determined using satellite data to determine a more precise location of the receiving device.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form to avoid unnecessarily obscuring the embodiments of the invention.

Global Navigation Satellite Systems (GNSS) Overview

GNSS systems allow capable ground receiving devices (e.g., a fixed device, a mobile device, or any other device that determines its location using satellite data) to calculate a user's position without the aid of any independent communications channels other than the data from the GNSS satellites themselves. The GNSS are comprised of complex space and ground components, the most emblematic of which are the large constellations of non-geostationary satellites that orbit the earth at about 12,500 miles, each transmitting real time streams of complex data regarding timing, orbits, satellite health, and other information. Such receiving devices must only be able to "see" the signals of four or more satellites of a single GNSS constellation in order to compute a user's location in three dimensions to a given degree of precision and certainty.

GNSS systems concept: a location can be determined in three dimensions if its distance from at least four different reference points in different planes is known. GNSS reference points consist of constellations of satellites in a variety of orbits sufficient to ensure that at least four satellites are "visible" to receiving devices, in all areas to be covered and at all times. Each satellite transmits a stream of coded data messages that allows receiving devices to determine the precise distance between the satellite and the receiving device. These messages include, among other information, very precise timing codes, the position and trajectory of the satellite, and satellite health. A capable receiving device can use the coded information received from four or more satellites of the same GNSS system to calculate its position.

But while GNSS systems are simple in theory, practical operations may be extremely complex, and very minor errors in the transmission, reception and processing of satellite data can result in significant degradation of accuracy and integrity. Some errors originate in the satellites and receiving devices themselves. Others are caused by environmental factors such as the atmosphere or the terrain and clutter near the receiving device.

TABLE 1

Sources of GNSS Errors

| Source | Effect |
| --- | --- |
| Ionospheric effects | ±5 meter |
| Ephemeris errors | ±2.5 meter |
| Satellite clock errors | ±2 meter |
| Multipath distortion | ±1 meter |
| Tropospheric effects | ±0.5 meter |
| Numerical errors | ±1 meter or less |

Errors originating at the satellite like satellite clock error, ephemeris error, and error due to orbital eccentricity are systemwide and impact all receiving devices.

Errors originating in the signal propagation, such atmospheric distortion and multipath, depend on the location of the receiving device.

Errors originating at the receiving device like receiving device clock error, and instrument biases depend on the receiving device itself.

Each type of error degrades the ability of a receiving device to resolve its location to the theoretical maximum level of precision. Table 1 summarizes the most common errors and their impact on location resolution. The effects of each error are cumulative, so that mitigating any type of error improves performance.

GNSS receiving devices rarely provide the full degree of precision that a given GNSS system is theoretically capable of delivering. For example, in theory, the US Global Positioning System (GPS) can provide three-meter resolution. In practice, its reliable precision is in the range of 10-15 meters. Moreover, the precision of a location reported by a given receiving device may not be a fixed value—a receiving device can approach the theoretical maximum precision in one moment at one location, and yet can report a significantly degraded precision a moment later or a short distance away. This variability can be as dangerous in life and death situations as it is frustrating when a user is trying to hail a rideshare or has overshot an exit on a multilane freeway.

Methods of Correcting GNSS Errors

There are several existing systems and approaches to improving the performance of stand-alone GNSS location determination. Most techniques require the creation and delivery to the receiving device of real-time, continuous streams of data, which can be variously characterized as "differential", "augmentation" or "corrections" data streams (referred to as "corrections streams"). These data streams compensate and correct for various kinds of errors that adversely impact precision and integrity. Capable GNSS devices, when actually receiving and processing such data streams, are able to use the delivered data to improve positioning accuracy.

In all such systems the method of communicating the data streams to the receiving devices is a critical and limiting factor. Full-time continuous communications links can be expensive. Assuring reliable, continuous reception to mobile devices as they travel through different geographies and topographies is challenging. So, the availability, cost, and performance of the communications links necessarily impose significant constraints on the design, implementation, use, performance and scalability of these systems.

Wide Area Differential Systems

Wide Area Differential systems, referred to as WADGPS systems, use a network of reference stations spread across very large areas (such as the continental United States) to quantify GNSS system errors in real time and generate corrections streams that allow receiving devices to improve precision as compared to the uncorrected coordinates otherwise determined. The corrections streams are transmitted to receiving devices either by uplink to a communications satellite for relay to users on Earth or may be available by the Internet and accessed by receiving devices via wireless mobile networks.

WADGPS services delivered by satellite, often referred to as satellite-based augmentation services (SBAS), have one important advantage: unlimited scalability. SBAS systems can serve an unlimited number of users with no incremental system load or cost for additional users. However, the corrections are typically much less precise than other systems. And satellite signals as received on the ground are very weak and easily blocked by terrain, foliage and buildings. SBAS can be difficult or impossible to receive without a continuous clear-sky view between the satellite and the receiving device. This has limited their utility in the areas of densest development and the most vehicular traffic and economic activity.

WADGPS corrections can also be accessed via the public Internet, including mobile wireless data networks. While this method overcomes the SBAS line of sight limitation, it negates the SBAS advantage of infinite scalability at zero incremental cost, because each receiving device needs a full time dedicated wireless link to receive the corrections.

Real Time Kinematics (RTK)

RTK systems can provide much higher precision within a limited geographic area than can be provided by WADGPS systems. An RTK system includes an RTK base station (which generates a real time differential data corrections stream), a transmission path (which sends the data continuously), and one or more receiving devices which receive and process the data streams to improve the precision of the location "fixes" they determine. RTK base station corrections are very precise in the immediate vicinity of the base station, but precision degrades as distance between the base and the receiving device increases, or with signal delays in the transmission path, because the differential data at the receiving device decorrelates from the reference station as a function of distance. In some embodiments, an RTK base station provides precision of <2 centimeters in the immediate vicinity of the base, and varying precision of sub-1 meter to sub-0.5 meter at distances of ~30-100 km from the base, with distance between the receiving device and base as the primary factor affecting degradation.

RTK systems also require continuous, dedicated communications links between the base station and each receiving device. These links typically consist of a temporary use, low power link created specifically for a session, such as a site surveying session, or the public Internet accessed by general purpose mobile data networks. In some embodiments, neither solution may be massively scalable. The receiving devices in the immediate vicinity of the base station can receive low power RTK data transmissions, and those transmissions are usually temporary. With public Internet delivery each user device requires a continuous individual mobile data link for the duration of the use session. But mobile data networks have limited capacity and suffer from interruptions and dropouts. These limitations have made RTK systems unsuitable for continuous (e.g., 24/7/365) use by tens of thousands or millions of receiving devices, which, in turn, has limited the penetration of RTK services and the utility of the data they provide.

Network RTK (NRTK) Systems

NRTK systems mitigate RTK's problem of declining precision over greater distances between the receiving device and the base by locating multiple base stations, often called Continuously Operating Reference Facilities (CORFs), across larger geographic areas. Each base station is capable of continuously providing corrections data for its coordinates via a communications channel to an NRTK server. An NRTK receiving device announces its uncorrected (rough) location to an NRTK server via a communications channel, which is usually a mobile data network. The NRTK server correlates that location to the nearest CORFs and uses the data from those correlated CORFs to generate a corrections stream based on a "virtual reference station" or VRS collocated with that specific receiving device. That VRF's custom corrections stream is then transmitted to the receiving device via a second communications channel which again is usually a mobile data network. The interpolated stream can emulate the precision that could be provided by a standard RTK base station located in the immediate vicinity of the receiving device (e.g., <2 cm).

While offering high precision relative to WADGPS and more consistent precision compared to stand-alone RTK systems, NRTK systems have significant limitations and disadvantages. NRTK systems are constrained by high operating costs, including additional server load for each active receiving device and the requirement for continuous, dedicated, two-way real-time communications links between the processing server and each receiving device. These factors make NRTK systems unsuitable for continuous use by large numbers of devices. Thus, an expensive and complex system of CORFs and an NRTK server or servers must be maintained for relatively few users. In addition, mobile data networks can be unreliable, causing loss of server synch and therefore of precision.

While existing systems provide enormous utility, they suffer from a paradox: those that provide the highest precision are costly and difficult to provide for continuous use at mass scale, while those that scale well provide lower precision and are unreliable in urban areas, where demand is greatest.

Overview of Television Stations

In some embodiments, television stations broadcast from tall towers with effective power as high as 1 million watts, a power level more than four orders of magnitude greater than that of a typical temporary use RTK frequency assignment, which in some embodiments is 35 watts or less. Some television stations can provide service more than 100 km from their towers, which are typically located on elevated terrain near the population centers of the regions they serve. Moreover, they may operate in the portion of the UHF frequency band that is best capable of penetrating buildings, foliage and terrain obstacles while still being receivable via small antennas used by handheld devices. Other stations may operate in the VHF band, which can provide very long-range coverage to vehicles equipped with whip antennas.

The ATSC 3.0 transmission standard, approved by the FCC in 2017 and currently being deployed across the United States, is based on orthogonal frequency division multiplexing (OFDM). OFDM as implemented in ATSC 3.0 television stations vastly improves the performance and flexibility of television stations to provide robust, high availability data services in challenging use cases. In some embodiments, many television standards rely on OFDM modulation and are compatible with the HPG system described herein.

The use of television broadcast signals to disseminate RTK corrections data has been described. See Hiromune Namie, Akio Yasuda, and Koji Sasano, RTK-GPS positioning by TV audio-MPX-data broadcast in Japan, Earth, Planets Space 52, 847-850 (2000), which is incorporated by reference in its entirety. As explained above, however, spatial decorrelation as the baseline between the RTK base station and the receiving device means such systems provide inconsistent precision across the very large coverage areas of television stations.

The disclosed embodiments describe a new approach that leverages high power television transmissions to provide far more uniform precision corrections data to receiving devices across the station's entire coverage area.

High Power Grid Corrections

Overview

The disclosed embodiments include an improved system (referred to as "High Power Grid (HPG)") that is suitable for providing ubiquitous, high precision corrections across a specified geographical area (e.g., entire metropolitan areas), which corrections may be received and used simultaneously by users even in the areas of densest populations and greatest economic activity, and which importantly can be extended to an unlimited number of users within a specified coverage area. In some embodiments, HPG leverages existing resources of high-power television stations that broadcast with an OFDM transmission standard, such as ATSC 3.0, to overcome the limitations of existing GNSS corrections services.

The high-power OFDM-based architecture of broadcast television transmissions may be ideal for providing reliable GNSS corrections data streams across entire metropolitan areas with unlimited scalability.

The HPG system provides the principal advantages of SBAS (scalability), RTK (precision), and NRTK (very high precision over larger areas) systems in a single system that also overcomes those systems' primary disadvantages. It also mitigates the principal disadvantage of other RTK-over-broadcast systems by providing consistent precision across the coverage area.

Description of the High-Power Grid

Figure 1:
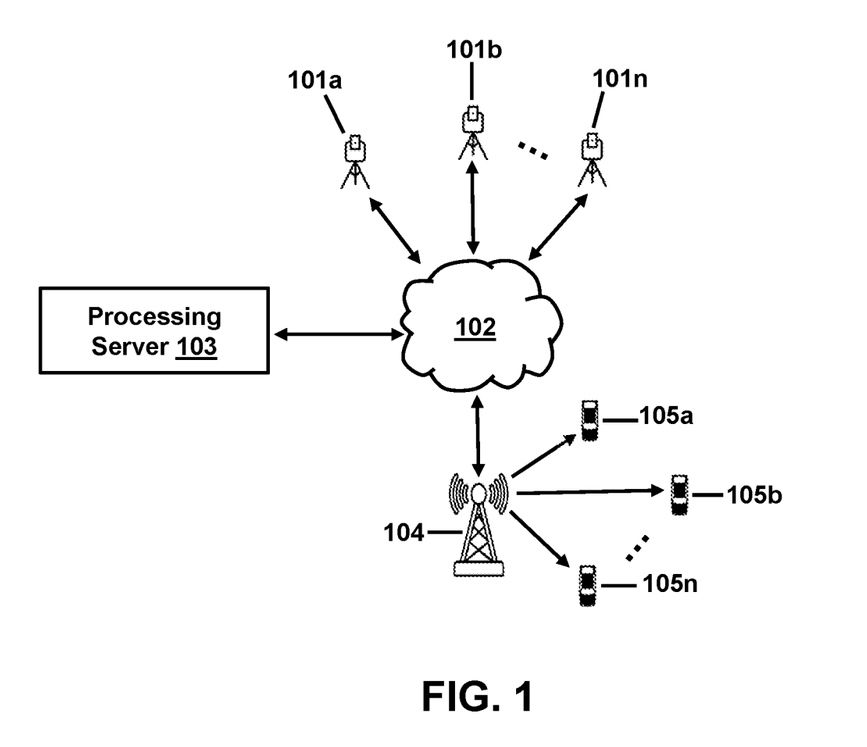
FIG. 1 is a system for providing location correction data to receiving devices, consistent with various embodiments.

FIG. 1 is a system for providing location correction data to receiving devices, consistent with various embodiments. The HPG consists of a number of RTK base stations, each a Local Grid Reference Facility or LGRF (e.g., 101a-101n) distributed across a given geographic area, the local grid area, which may correlate with the signal coverage areas of one or more television stations. The LGRFs 101a-101n may be spaced uniformly in a grid and/or may be located at other sites depending upon system requirements, provided that all points within the local grid area are within a triangle defined by at least three LRGF sites. Some or all of the LGRFs 101a-101n may optionally consist of existing CORFs associated with an existing RTK network. The LGRF located closest to the center of the local grid area may be designated the Primary Local Grid Reference Facility (PLGRF).

Each LGRF is precisely surveyed and continuously calculates precise error factors for one or more GNSS systems, which may be resolved as differential corrections, as raw error determinations for specific error types (atmospheric, satellite clock, etc.), or in any other method compatible with RTK systems and NRTK systems then in use. As depicted in FIG. 1 the corrections data stream of each LGRF 101a-101n is transmitted by a communications channel 102, which may be a dedicated wireline, fiber, or radiofrequency link or the public Internet, to a processing server 103, which is referred to as a Local Network Master Server (LNMS). The LNMS (a) adds unique stream identifiers for each LGRF data stream, (b) generates a data table, the Local Grid Index (LGI), which indexes all LGRF streams to each LGRF's specific coordinates, (c) packages the multiple LGRF data streams and the LGI table into a combined data stream, and (d) delivers the combined stream via a communications channel to a television broadcast station, which may be a television station 104 transmitting in an OFDM format such as ATSC 3.0. The television station 104 (e) broadcasts the composite data stream via its associated transmitter, tower and antenna. The data stream (and the LGI table, if transmitted separately as a file), (f) are received from the television transmission by one or more receiving devices 105a-105n within the television station's signal coverage area, which receiving devices 105a-105n are equipped with a receiving device capable of receiving, demodulating and decoding the composite data stream and, if transmitted separately, the LGI tables.

In some embodiments, the LGI tables may be transmitted via a separate stream. The LGI table is a file that may be periodically updated, and may not be a continuous stream of data. The LGI may also include other data, such as the frequency channels and locations of other nearby television stations that also transmit corrections data.

The receiving device may include of an antenna or antennas capable of receiving the VHF and/or UHF band signals of broadcast television stations and the L-band transmissions of GNSS satellites, or one or more connectors capable of receiving signals from external antennae, a power supply, which may be external, a radio receiver, a computer processor, writeable memory, a GNSS module, and an output port.

The receiving device receives GNSS satellite data from an L-band antenna and the broadcast signal from a UHF or VHF antenna. The receiving device sends the L-band signals to the GNSS module and the broadcast signal to the broadcast radio receiver. The GNSS module calculates the receiving device's rough (uncorrected) coordinates and sends them to the computer processor. The broadcast radio receiver sends the consolidated corrections data stream and the LGI tables to the computer processor, which stores the LGI tables in the writeable memory. The computer processor uses the LGRF coordinates in the LGI tables and the coordinates of the receiving device's rough, uncorrected location to determine which LGRF is closest to the receiving device (and therefore will provide the best corrections data to the receiving device). The computer processor then sends the corrections data for the nearest LGRF to the GNSS module, which applies the corrections stream to the uncorrected coordinates to improve the precision of the reported location. The corrected coordinates are sent to the output for use by positioning and navigation applications and devices.

The computer processor periodically or continually compares the uncorrected coordinates to the LGI tables to determine the nearest LGRF. This is necessary for best performance because receiving devices may be used in fixed locations, but more commonly are used in nomadic and mobile use cases. Moreover, new permanent or temporary LGRFs may be added to the LGI.

The computer processor can be programmed to default to the PLGRF data stream if the location to the nearest LGRF cannot be determined.

Optionally the receiving device may consist of an HPG module that is coupled with an external GNSS receiver capable of receiving and processing corrections streams in industry standard data correction message formats such as RTCA, NMEA, or others.

HPG Performance

The HPG system provides very high and consistent precision over larger areas as compared to RTK systems. It can provide precision rivaling that of NRTK systems with consistency that exceeds the requirements of most positioning and virtually all navigation requirements. Moreover, peak, average and minimum precision can all be increased simply by increasing the number of LRFs, either physical or virtual. Importantly, an HPG system can be accessed by an unlimited number of users at zero incremental cost per user, and the corrections streams are compatible with most receiving devices capable of using RTK corrections.

HPG may differ materially from the traditional RTK networks, which have high fixed costs and can only serve a limited number of receiving devices. HPG addresses these scalability and cost constraints by taking the opposite approach of NRTK systems. Rather than providing an individually calculated and delivered base station corrections stream to each individual receiving device via continuous two-way communications channels, HPG provides a dense grid of continuously operating LGRFs in a served television coverage area and provides each receiving device with necessary data to identify and use the corrections data from the nearest LGRF regardless of its location and movement within the coverage area, and without the requirement for each receiver to maintain a continuous two way communication links with the processing server.

Unlike NRTK, HPG is a passive system consistent with the original design requirements of the GPS system, which was the first GNSS system. In some embodiments, the original designers wanted an unlimited number of military users to be able to use the system without the cost and limitations of a return communications path, and they did not want military units to be required to transmit and thereby reveal their presence and general location.

Like the GPS system and all subsequently built GNSS systems, HPG may not assume or require the availability of any additional communications channel other than the broadcast signal itself in order to provide GNSS corrections. This passive system eliminates much of the complexity and cost inherent in NRTK systems, and is far more private and secure from the user's perspective.

Figure 2:
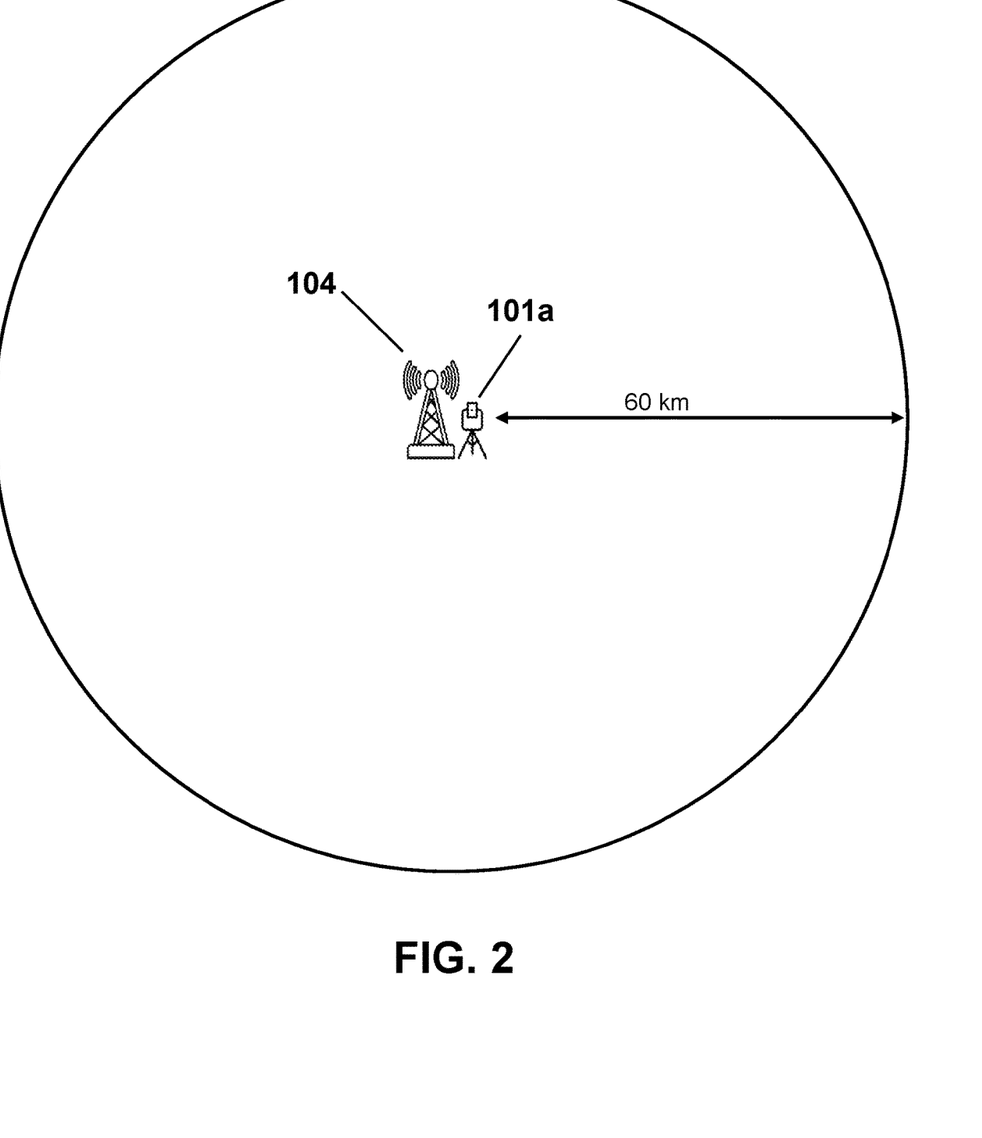
FIG. 2 shows a television coverage radius of a television station, consistent with various embodiments.

As noted above, higher grid density results in greater precision. The more LGRFs deployed, the shorter the maximum potential baseline between a receiving device and the nearest LGRF. Shorter distances mean less spatial decorrelation between the receiving device and the LGRF and therefore higher precision. FIG. 2 shows a television coverage radius of a television station 104, consistent with various embodiments. The television coverage radius may depend on various factor and may vary significantly. For example, as illustrated in FIG. 2, the television coverage radius is 60 km. In this example, a single RTK base station 101a, or reference facility 101a, is co-located with a transmission site of the television station 104. Assuming a circular transmitting antenna pattern for the television station and uniform terrain features, the maximum distance between the base station and any receiving device would be 60 km on all radials.

As explained above, the accuracy of RTK corrections degrades as a receiving device moves further from the RTK base station. This necessarily means that the data from a single RTK base will be less useful for applications requiring the highest accuracy as distances between the receiving device and the base station increase.

Figure 3:
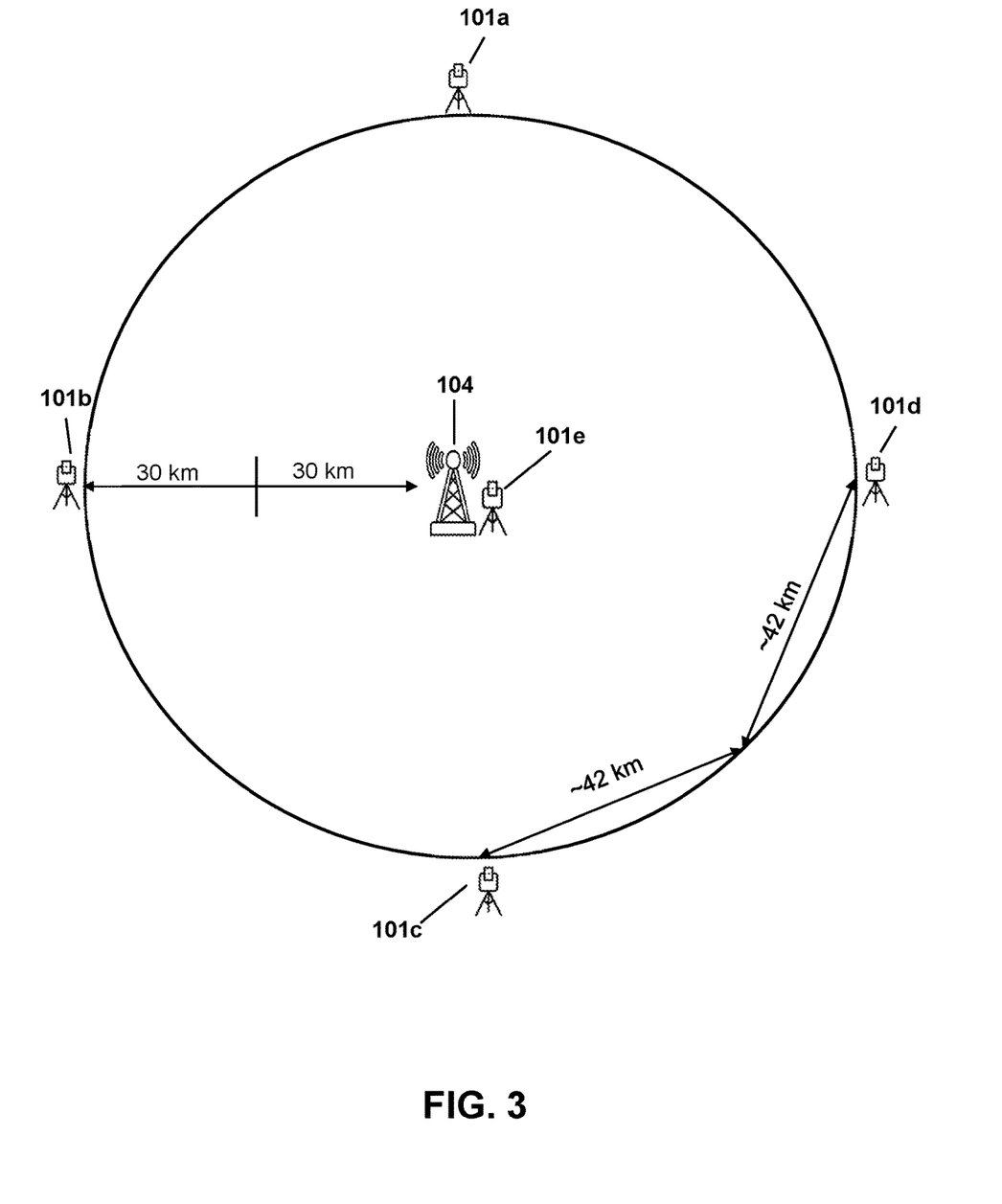
FIG. 3 illustrates a grid of local grid reference facilities (LGRFs), consistent with various embodiments.

FIG. 3 illustrates a grid of LGRFs, consistent with various embodiments. FIG. 3 illustrates how a grid of LGRFs can reduce the maximum distance between any receiving device and the nearest base and therefore reduce decorrelation of differential data for any receiving device. Assuming the same hypothetical coverage radius of 60 km, four LGRFs 101a-101d located on the coverage perimeter on two perpendicular axes, in combination with the PLGRF 101e, reduce the maximum base-receiving device distance from ~60 km to ~42 km. More importantly, they disproportionally reduce the average base-to-receiving device distance when the PLGRF 101e is co-located near the population center, since most receiving devices will typically be operating where population density is highest. This provides a much more substantial improvement in the accuracy for most receiving devices most of the time and far more consistent precision across the coverage area.

Selection of five LGRFs (including the PLGRF) in FIG. 3 is arbitrary and for illustration only. The number and locations of the LGRFs depends on the performance objectives for the area served. Adding more LGRFs further reduces the maximum potential baseline distance and therefore improves the minimum accuracy for receiving devices throughout the coverage area.

As few as five LGRF facilities are sufficient to provide reliable precision of less than 5 cm to the majority of traffic within most greater metropolitan areas.

Larger numbers of LGRF sites can be deployed to improve average precision while substantially reducing variability. A single television station can easily support continuous transmission of corrections streams from dozens LGRFs providing precision greater than required for all but the most demanding applications. However, the cost and complexity of building so many LGRFs would be significant. Each LGRF requires power, reliable connectivity, a secure site, and antenna placement with an unobstructed view from overhead all the way down to the horizon in all directions.

Figure 4:
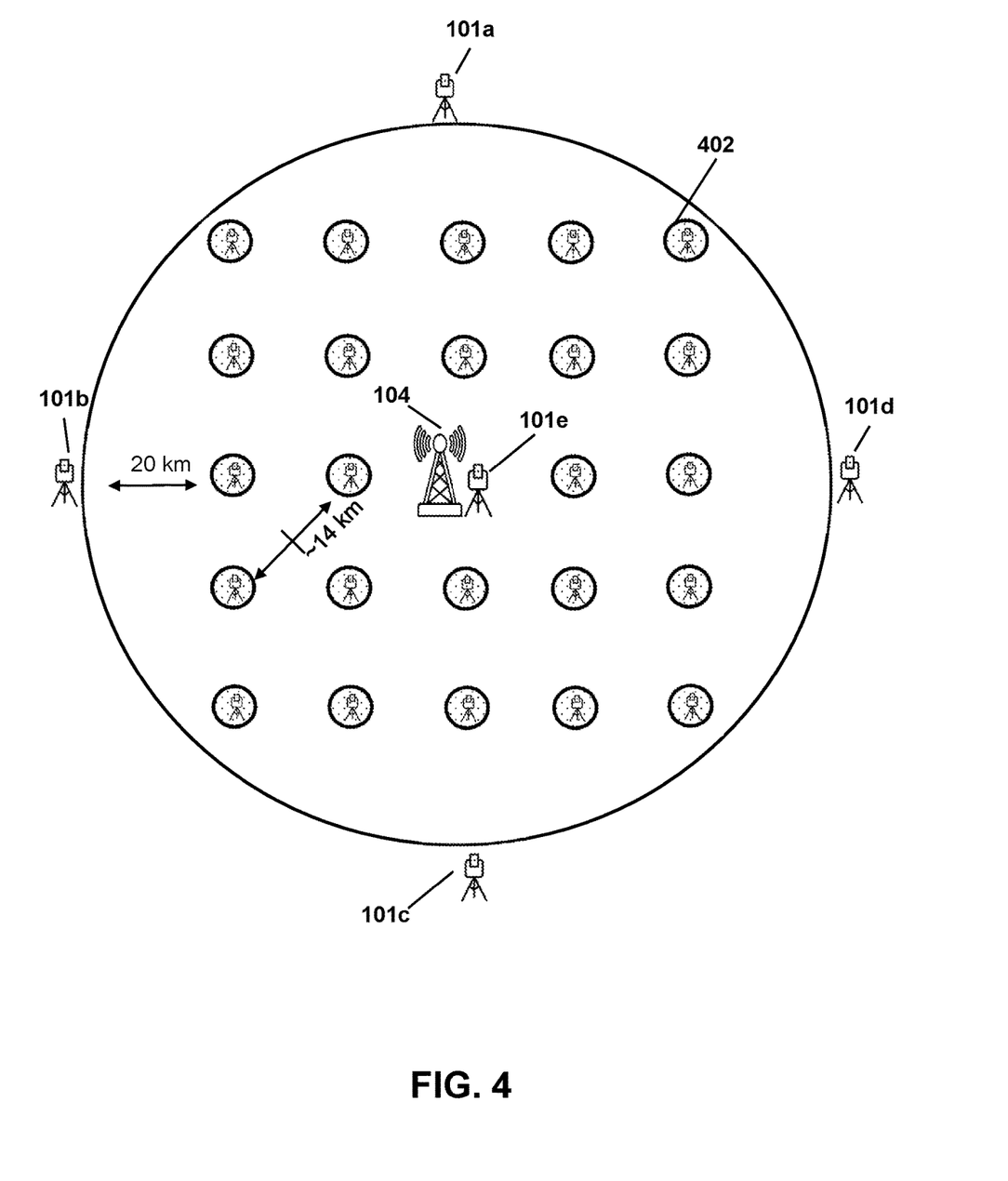
FIG. 4 illustrates placement of a number of virtual LGRFs, consistent with various embodiments.

But not all LGRFs require physical infrastructure at the site. HPG grid density can be increased by adding corrections for interpolated LGRF sites, each, a Virtual Local Grid Reference Facility (VLGRF). The LNMS uses the data streams from each physical LGRF to calculate additional interpolated, or virtual, LGRF corrections streams using the same types of methods used by NRTK servers to create virtual reference stations. The LNMS can calculate virtual corrections streams for any set of coordinates within a triangle defined by any three physical LGRFs.

FIG. 4 illustrates placement of a number of VLGRFs, consistent with various embodiments. Assuming the same hypothetical arrangement reflected in FIG. 4, creation of 24 VLGRFs, such as VLGRF 402, on a 20 km grid can reduce the maximum potential distance between a receiving device and its nearest LGRF 101a-101n or VLGRF 402 from ~42 km to ~14 km. This not only greatly improves the average accuracy for all receiving devices, it also greatly reduces the variability of the accuracy.

This system provides several advantages as compared to NRTK systems, including most notably scalability and cost advantages. Rather than creating a VRS for each receiving device and maintaining continuous two-way data links with each individual receiving device, as NRTK systems do, the HPG creates a dense grid of physical and virtual reference sites, indexes those sites, and the HPG receiving devices always receive the corrections stream from the nearest reference site.

In addition, with continuous updating of the Local Grid Index tables, VLGRF sites can be created on demand anywhere and anytime better precision is needed for receiving devices in a particular location at a particular time. This might include including major highway interchanges at rush hour, disaster sites, event venues, edge cities, industrial parks, manufacturing sites, traffic hubs, or to support surveying, construction, or emergency response.

All differential streams, both LGRF and VLGRF, with their stream identifies and reference coordinates, are then transmitted in the televisions station's high-power signal so that all streams are transmitted to all locations within the station's coverage area. Each HPG capable receiving device within a coverage area therefore has continuous real time access to the differential corrections data for all physical and virtual reference stations.

The paradox of existing schemes is therefore that those that are most scalable do not work well in developed areas, where scalability is most important. HPG threads an elegant and capable middle ground that overcomes the paradox by providing very substantial improvements to precision while being infinitely scalable. Rather than providing separate transmission paths for each user, HPG provides separate data streams for each location via a common, low-cost, high-availability transmission platform. In this way an unlimited number of simultaneous users can take advantage of the corrections stream that is most appropriate for that user at the time and place of use. There is no need to meter and charge for incremental use because the system is never overloaded, either at the point of processing or the point of transmission.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 5:
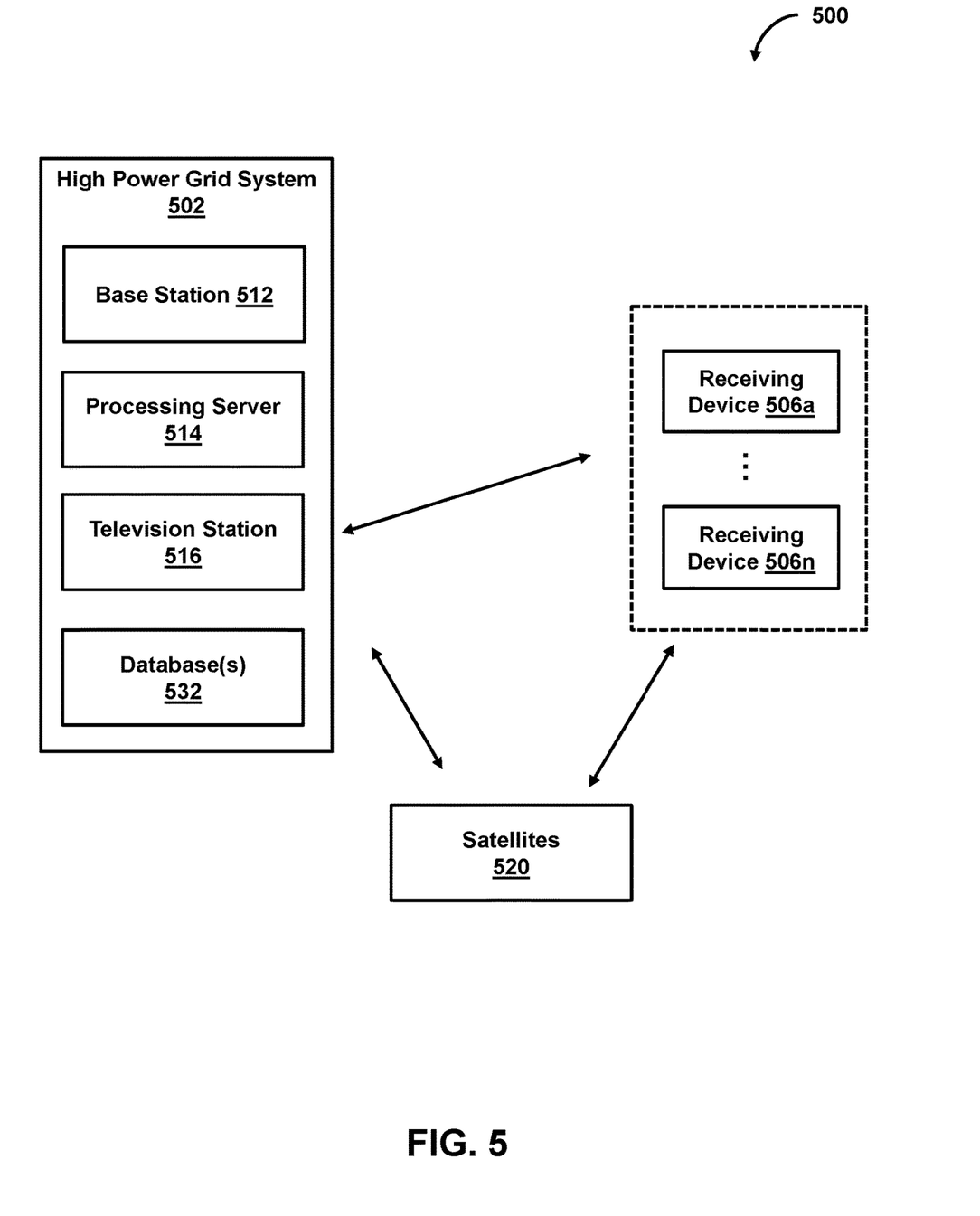
FIG. 5 is a block diagram of a system for providing location correction data to receiving devices, consistent with various embodiments.
Figure 6:
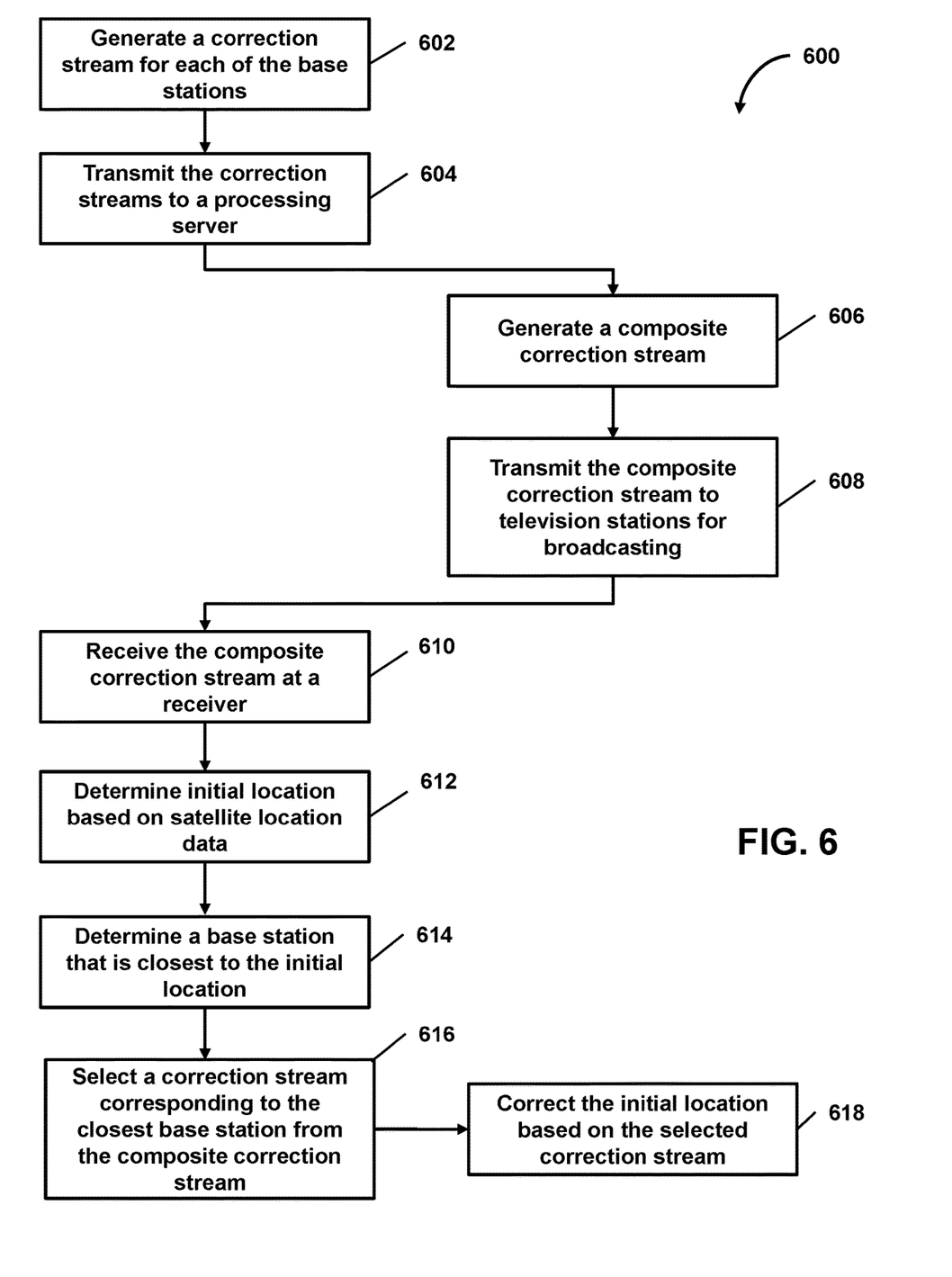
FIG. 6 is a flow diagram of a process for providing location correction data to receiving devices, consistent with various embodiments.

FIG. 5 is a block diagram of a system 500 for providing location correction data to receiving devices, consistent with various embodiments. FIG. 6 is a flow diagram of a process 600 for providing location correction data to receiving devices, consistent with various embodiments. In some embodiments, the process 600 may be implemented using the system 500 of FIG. 5.

At operation 602, a base station 512 (e.g., LGRF) generates a corrections stream. The corrections stream may include error data for one or more satellites 520 (e.g., GNSS) that contributes to an error in determining a location of a receiving device (e.g., receiving device 506a or any other receiving device 506b-506n). In some embodiments, the base station 512 is similar to the base station 101a-101n; and the receiving devices 506a-506n are similar to the receiving devices 105a-105n of FIG. 1. Each LGRF may be surveyed and configured to continuously calculate precise error factors for one or more satellites 520 the LGRF is communicating with, which may be resolved as differential corrections, as raw error determinations for specific error types (e.g., atmospheric, satellite clock, etc.), or in any other method compatible with RTK systems and NRTK systems. In some embodiments, the error data is indicative of errors originating in a satellite, the receiving device, or errors caused due to environmental factors that may impact the accuracy of the determination of location of the receiving device. This error data from the corrections stream may be used by the receiving devices to correct or compensate any errors or improve any accuracy in the determination of a location of the receiving devices.

At operation 604, the base station 512 transmits the corrections stream. In some embodiments, the base station 512 transmits the corrections stream to a processing server 514 (e.g., LNMS) of the HPG system 502. The base station 512 may transmit the corrections stream using a network, which may include a dedicated wireline, fiber, RF link, or Internet.

In some embodiments, the corrections stream is generated and transmitted by each base station 512 implemented in the HPG system 502. For example, if there are hundred ("100") base stations deployed in a geographic area, then 500 corrections streams are generated and transmitted in the system 500.

At operation 606, a processing server 514 receives the corrections streams from the base stations 512 and generates a composite corrections stream. In some embodiments, the processing server 514 adds a unique stream identifier to each of the corrections streams, and generates a local grid index (e.g., a data table) in which each of the corrections streams is associated with location data of the corresponding base station from which the corrections stream is received. The processing server 514 combines the corrections streams with the local grid index to generate the composite corrections stream. The processing server 514 may receive all the corrections streams at the same time or at different times. In some embodiments, the processing server 514 is similar to the processing server 103 of FIG. 1.

At operation 608, the processing server 514 transmits the composite corrections stream to multiple television stations (such as television station 516, which may be similar to television station 104) for further broadcasting of the composite corrections stream in a television broadcast frequency. The processing server 514 may transmit the composite corrections stream to the television stations using a network, which may include a dedicated wireline, fiber, RF link, or Internet. The television station 516 may broadcast the composite corrections stream in an OFDM format (e.g., ATSC 3.0). The television station 516 may broadcast the composite corrections stream via its associated transmitter, tower, or antenna.

At operation 610, a receiving device (e.g., receiving device 506a) receives the composite corrections stream from a television station. For example, the receiving device 506a within a signal coverage area of the television station 516 may receive composite corrections stream from the television station 516. The receiving device 506a may be a fixed device or a mobile device (e.g., a receiving device) configured to receive and process data transmitted over various frequency ranges, such as a television broadcast frequency (e.g., VHF, UHF, etc.) and satellite communication frequency (e.g., L-band).

At operation 612, the receiving device 506a determines an initial location (e.g., uncorrected) of the receiving device 506a. For example, the receiving device 506a may receive satellite location data (e.g., GNSS satellite data) from one or more GNSS satellites 520, which may be used to determine the initial location of the receiving device 506a.

At operation 614, the receiving device 506a determines a base station that is closest to the initial location of the receiving device 506a. For example, the receiving device 506a uses the location data of the base stations included in the local grid index of the composite corrections stream and the initial location of the receiving device 506a to determine which base station is closest to the receiving device 506a.

After identifying the closest base station, at operation 616, the receiving device 506a selects the corrections stream of the closest base station from the composite corrections stream.

At operation 618, the receiving device 506a corrects the initial location of the receiving device 506a using error data from the selected corrections stream to generate a corrected location of the receiving device 506a. In some embodiments, the receiving devices are able to select the best corrections stream with no two-way communications channel with no return path (e.g., forward path only) to the television station 516 or the processing server 514. By broadcasting many corrections streams each from different reference coordinates and letting each receiving device continually select the best corrections stream, rather than sending an individual stream, the system 500 enables a receiving device to determine its location more precisely.

Figure 7:
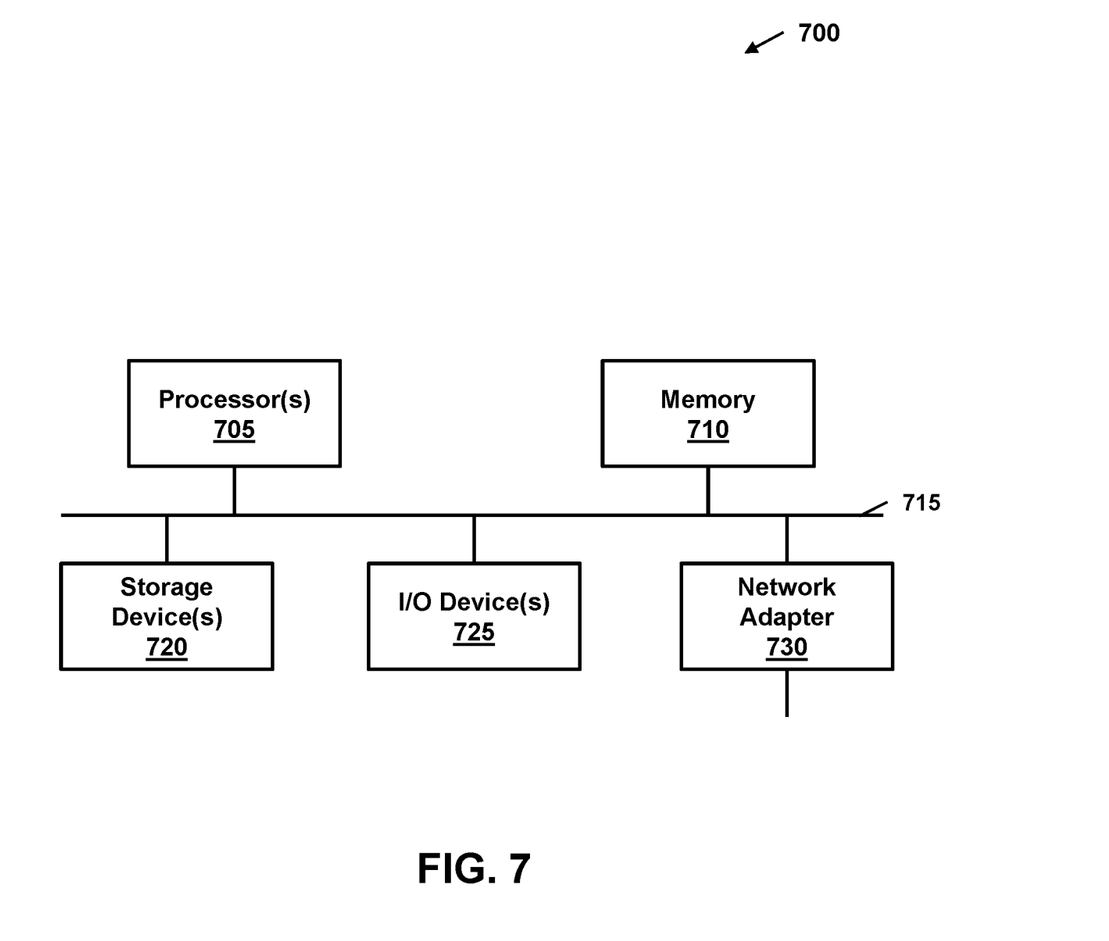
FIG. 7 is a block diagram of a computer system as may be used to implement features of the disclosed embodiments.

In some embodiments, the various computers and components or entities illustrated in FIG. 5 may include one or more computing devices (e.g., such as a computer system 700) that are programmed to perform the functions described herein. The computing devices may include one or more electronic storages (e.g., database(s) 532 to store various data e.g., receiving device related data, LGRF related data, processing server related data, LGI, user related data, etc., or other electronic storages), one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 502-520 or other entities. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 502-520 described herein is for illustrative purposes, and is not intended to be limiting, as any of subsystems 502-520 may provide more or less functionality than is described. For example, one or more of subsystems 502-520 may be eliminated, and some or all of its functionality may be provided by other ones of subsystems 502-520. As another example, additional subsystems may be programmed to perform some or all of the functionality attributed herein to one of subsystems 502-520.

FIG. 7 is a block diagram of a computer system as may be used to implement features of the disclosed embodiments. The computer system 700 may be used to implement any of the entities, subsystems, components or services depicted in the examples of the foregoing figures (and any other components described in this specification). The computer system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The instructions stored in memory 710 can be implemented as software and/or firmware to program the processor(s) 705 to carry out actions described above. The processors may be programmed to execute computer program instructions by software; hardware; firmware; some combination of software, hardware, or firmware; and/or other mechanisms for configuring processing capabilities on the processors. In some embodiments, such software or firmware may be initially provided to the computer system 700 by downloading it from a remote system through the computer system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system for providing location correction data to receiving devices, the system comprising:
    multiple base stations, wherein a first base station of the base stations is configured to:
        generate a first corrections stream including (a) a first error data for one or more satellites that contributes to an error in determining a location of receiving devices, and (b) a first location data of the first base station, and
        transmit the first corrections stream;
    a processing server, wherein the processing server is configured to:
        receive multiple corrections streams from the base stations,
        generate a composite corrections stream from the corrections streams, wherein the corrections streams are indexed based on location data of the base stations, and
        transmit the composite corrections stream to multiple television stations for broadcasting in a television broadcast frequency; and
    a receiving device, wherein the receiving device is configured to:
        receive satellite location data from the one or more satellites to compute a location of the receiving device,
        receive the composite corrections stream broadcasted from a television station of the television stations,
        select a specified corrections stream corresponding to a specified base station from the composite corrections stream, and
        correct the location of the receiving device based on a specified error data from the specified corrections stream to generate a corrected location.

2. The system of claim 1, wherein the base stations are located across a specified geographical region such that any location in the specified geographical region is within a triangle defined by at least three base stations.

3. The system of claim 1, wherein the base stations are located on a perimeter of a signal coverage area associated with the television station.

4. The system of claim 1, wherein the first base station is located in the same location as the television station.

5. The system of claim 1 further comprising:
    multiple virtual base stations within a signal coverage area associated with the television station, wherein the virtual base stations include a first virtual base station that is associated with a virtual corrections stream computed based on a location of the first virtual base station within a triangle defined by at least three of the base stations.

6. The system of claim 1, wherein the processing server is configured to generate the composite corrections stream by:
    adding a unique stream identifier to each of the corrections streams,
    generating a local grid index in which each of the corrections streams is associated with location data of the corresponding base station from which the corresponding corrections stream is received, and
    combining the corrections streams with the local grid index to generate the composite corrections stream.

7. The system of claim 6, wherein the local grid index is transmitted as a data file in the composite corrections stream.

8. The system of claim 1, wherein the receiving device is configured to receive the satellite location data in a frequency different from the television broadcast frequency in which the composite corrections stream is received.

9. The system of claim 1, wherein the receiving device is configured to select the specified corrections stream by:
determining, based on the location data of the base stations in the composite corrections stream, one of the base stations that is closest to the location of the receiving device as the specified base station, and
obtaining the specified corrections stream from the composite corrections stream based on specified location data associated with the specified base station.

10. The system of claim 1, wherein the receiving device is a mobile device that is capable of receiving and processing the satellite location data and the composite corrections stream.

11. A method for providing location correction data to receiving devices, the method comprising:
generating, using a first base station of multiple base stations, a first corrections stream including a first error data for one or more satellites that contributes to an error in determining a location of a receiving device;
receiving, at a processing server, multiple corrections streams from the base stations;
transmitting, using the processing server, a composite corrections stream to multiple television stations for broadcasting in a television broadcast frequency, wherein the composite corrections stream includes, for each of the base stations, a corrections stream and location data of the corresponding base station; and
causing the receiving device to:
receive the composite corrections stream broadcasted from a television station of the television stations, and
correct a location of the receiving device determined based on satellite location data using a selected corrections stream from the composite corrections stream to generate a corrected location.

12. The method of claim 11, wherein receiving the corrections streams further includes:
adding, by the processing server, a unique stream identifier to each of the corrections streams;
generating a local grid index in which each of the corrections streams is associated with location data of the corresponding base station from which the corresponding corrections stream is received; and
combining the corrections streams with the local grid index to generate the composite corrections stream.

13. The method of claim 11, wherein transmitting the composite corrections stream includes:
transmitting the composite corrections stream in the television broadcast frequency using orthogonal frequency division multiplexing.

14. The method of claim 11 further comprising:
causing the receiving device to receive the satellite location data from the one or more satellites to compute an initial location of the receiving device.

15. The method of claim 11, wherein causing the receiving device to receive the composite corrections stream includes:
causing the receiving device to receive the satellite location data in a frequency different from the television broadcast frequency.

16. The method of claim 11, wherein causing the receiving device to correct the location of the receiving device includes:
causing the receiving device to compute an initial location of the receiving device based on the satellite location data;
causing the receiving device to identify, from the composite corrections stream, a specified base station associated with the location data that is closest to the initial location;
causing the receiving device to select a specified corrections stream corresponding to the specified base station from the composite corrections stream; and
causing the receiving device to correct the initial location of the receiving device based on a specified error data from the specified corrections stream to generate the corrected location.

17. The method of claim 11, wherein causing the receiving device to correct the location of the receiving device includes:
causing the receiving device to correct the location of the receiving device based on a virtual corrections stream associated with a virtual base station, wherein the virtual corrections stream is computed based on a location of the virtual base station within a triangle defined by at least three of the base stations.

18. The method of claim 11, wherein causing the receiving device to correct the location of the receiving device includes:
causing the receiving device to correct the location of the receiving device based on a corrections stream of a base station of the base stations that is located at a perimeter of a signal coverage area associated with the television station, or located in the same location as the television station.

19. The method of claim 11, wherein the first error data is indicative of errors originating in one or more satellites, the receiving device, or errors caused due to environmental factors.

20. A non-transitory computer-readable medium having instructions that, when executed by a computer, cause the computer to execute a method, the method comprising:
generating, using a first base station of multiple base stations, a first corrections stream including a first error data for one or more satellites that contributes to an error in determining a location of a receiving device;
receiving, at a processing server, multiple corrections streams from the base stations;
transmitting, using the processing server, a composite corrections stream to multiple television stations for broadcasting in a television broadcast frequency, wherein the composite corrections stream includes, for each of the base stations, a corrections stream and location data of the corresponding base station; and
causing the receiving device to:
receive the composite corrections stream broadcasted from a television station of the television stations, and
correct a location of the receiving device determined based on satellite location data using a selected corrections stream from the composite corrections stream to generate a corrected location.

* * * * *